US011196155B1

(12) United States Patent
Azad et al.

(10) Patent No.: US 11,196,155 B1
(45) Date of Patent: Dec. 7, 2021

(54) COLLOCATED RADIOS WITH IMPROVED ANTENNA ISOLATION

(71) Applicant: Amazon Technologies, Inc., Seattle, WA (US)

(72) Inventors: Mohammed Ziaul Azad, Pleasanton, CA (US); Chen Chen, Sunnyvale, CA (US); Amit Gaikwad, Saratoga, CA (US); In Chul Hyun, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/713,901

(22) Filed: Dec. 13, 2019

(51) Int. Cl.
*H01Q 1/52* (2006.01)
*H04B 1/3827* (2015.01)
*A63F 13/327* (2014.01)
*H01Q 1/22* (2006.01)
*H01Q 1/38* (2006.01)
*H04B 1/00* (2006.01)

(52) U.S. Cl.
CPC ........... *H01Q 1/521* (2013.01); *A63F 13/327* (2014.09); *H01Q 1/2291* (2013.01); *H01Q 1/38* (2013.01); *H04B 1/0064* (2013.01); *H04B 1/3833* (2013.01)

(58) Field of Classification Search
CPC ........ H01Q 1/521; H01Q 1/2291; H01Q 1/38; H04B 1/0064; H04B 1/3833; A63F 13/327
USPC ....................................................... 455/90.2
See application file for complete search history.

(56) References Cited

U.S. PATENT DOCUMENTS

| 2008/0316121 | A1* | 12/2008 | Hobson | H01Q 5/40 343/702 |
| 2016/0190700 | A1* | 6/2016 | Wang | H01Q 1/38 343/700 MS |
| 2019/0252253 | A1* | 8/2019 | Verma | H01L 29/41733 |

* cited by examiner

*Primary Examiner* — Eugene Yun
(74) *Attorney, Agent, or Firm* — Eversheds Sutherland (US) LLP (57) ABSTRACT

Devices, systems, and methods are provided for improving antenna isolation for collocated antennae. A device may include a first radio associated with a first antenna to transmit and receive first wireless signals using a first wireless communication technique. The device may include associated with a second antenna to transmit and receive second wireless signals using a second wireless communication technique. The device may include a multi-antenna isolation structure having a first portion and a second portion separated from the first portion, the first portion and the second portion are able to prevent the first antenna from receiving a portion of current associated with the second antenna.

20 Claims, 8 Drawing Sheets

COLLOCATED RADIOS WITH IMPROVED ANTENNA ISOLATION

BACKGROUND

A variety of devices, such as game controllers, smartphones, tablets, and other devices are increasingly using multiple wireless communication technologies. When multiple antennae are used for wireless communications, particularly when multiple antennae are close to each other, interference may undermine wireless communication performance by reducing throughput and increasing latency. Therefore, user experience with wireless devices may be improved by improving antenna isolation.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for improving antenna isolation in devices with collocated radios in a very closed antenna system.

Some wireless devices may have multiple radios which use respective antennae to send and receive wireless signals. For example, a wireless device may have a Bluetooth radio with antennae, a Wi-Fi radio with antennae, and/or a Zigbee radio with antennae. When a wireless device has collocated radios (e.g., two or more radios using different wireless communication techniques), the wireless device may share the same antennae among the different radios, or the radios may have their own respective antennae. Sharing antennae among multiple radios may allow for the use of less hardware, but latency may be a challenge in some situations when the antennae are being used for one type of wireless communication (e.g., Bluetooth) and have to wait to use the antennae for another type of wireless communication (e.g., Wi-Fi or Zigbee). Dedicated antennae for the different radios may require additional hardware, such as antennae, but may avoid latency and throughput problems that shared antennae may incur. For example, a Wi-Fi radio (e.g., an IEEE 802.11 radio for wireless local area network communications) may send and receive wireless signals using Wi-Fi antennae while a Bluetooth radio (e.g., an IEEE 802.15.1 radio) may send and receive wireless signals using Bluetooth antennae.

The reduced latency facilitated by the use of dedicated antennae for different wireless communication radios may allow some wireless devices to perform functions over one or more networks. For example, a wireless device may be used as a game controller when the game content is provided by a remote network (e.g., a cloud-based network). The wireless device may send wireless signals using the antennae to the remote network rather than to a game console (e.g., a game console used in other types of gaming applications), for example, and the remote network may stream the game to another device for presentation. In this manner, a remote network may control the presentation of a game based on the game controller inputs received from the wireless device. In such an example, low latency may be required to respond to a user's input controls for a game in real-time. Therefore, a wireless device with game controller functionality for cloud-based gaming may use multiple radios with respective dedicated antennae for wireless communications. For example, the wireless device may send game control inputs (e.g., joystick movements, button pushes, hand gestures, voice inputs, etc.) to a cloud-based network, and may send control signals (e.g., power on and off signals, volume adjustments, etc.) to other devices such as a display or game console, and may send in-game messages (e.g., Bluetooth messages) to other devices, including audio messages with voice data (e.g., voice chat messages). For example, a headset or other device with a microphone may capture voice and other sound data and send the voice or sound data to the wireless device, which may send corresponding messages using a radio.

For a wireless device to function as a game controller, user experience may benefit from the wireless device being small enough to be handheld. A handheld game controller may be limited in physical space, and therefore collocated radios may be located in close proximity (e.g., less than 15 millimeters apart). In addition, due to the game controller being held with both hands covering most of the device, the amount of room for positioning multiple antennae may be limited, so the antennae may need to be placed very close in proximity to each other. The close proximity of collocated radios used for co-transmissions may cause interference between the radios, which may degrade throughput and latency, causing game play to lag and/or input controls to not be processed properly, if at all. In addition, interference may damage chipsets supporting the radios by receiving coupled power at one radio from another radio.

Antenna isolation may refer to a measure of how closely coupled multiple antennae are to one another. Antennae for one type of radio may send and receive signals in a frequency band that overlaps with the frequency band used by antennae of a collocated radio of another communication type. For example, when a Wi-Fi radio sends Wi-Fi signals using Wi-Fi antennae, a collocated Bluetooth/Zigbee radio may receive the Wi-Fi radios even though the Wi-Fi signals are not intended for the Bluetooth radio. This may cause interference for the Bluetooth/Zigbee radio that may be sending or receiving Bluetooth/Zigbee signals, and may overpower the Bluetooth/Zigbee radio, possibly causing chipset damage. Increased antenna isolation may reduce interference and collocated coupling, and antenna isolation may be increased by increasing physical separation (e.g., distance) between collocated antennae and/or using different polarization for the antennae. These adjustments may not be feasible in a handheld device with collocated radios operating at overlapping frequencies, however.

Therefore, the performance of wireless devices may be improved by increasing the antenna isolation for antennae of collocated radios.

In one or more embodiments, antenna isolation for wireless device collocated radios separated by less than 15 millimeters (e.g., 10 millimeters or less) may be improved from less than 10 decibels (dB) to 18 or more dB by using a bandgap structure. The bandgap structure may include multiple conductive components (e.g., copper, silver, gold, alloys, etc.), some on one side of a circuit board (e.g. a printed circuit board), and some on another side of the circuit board (e.g., the front and back of the circuit board for spatial efficiency). The band gap structure may be positioned at least partially in between collocated radios (e.g. a Bluetooth radio, a Wi-Fi radio, and/or a Zigbee radio), which may be included in the wireless device and may communicate in overlapping frequency bands, and which may be separated by a gap. The conductive elements forming the band gap structure may act as a filter to trap or "choke" current (e.g., receive current from one radio and prevent/block/restrict the current from reaching the other radio) which may travel from one collocated radio (e.g., when sending or receiving signals) to another collocated radio of the wireless device. The size of the band gap structure may vary based on the frequencies used by the collocated radios for wireless communications. For example, because isolation may increase when using higher frequencies, the size of the band gap structure may be smaller for wireless devices whose collocated radios communicate in higher frequency bands than for wireless devices whose collocated radios communicate in lower frequency bands.

In one or more embodiments, the collocated radios may communicate in the 2.4 GHz frequency band, so the size of the band gap structure may need to be large enough (e.g., at 2.4 GHz) to produce antenna isolation of 15 dBs or more (e.g., 18 or more dBs) when the collocated antennae are 15 millimeters or less apart (e.g., 10 millimeters). For example, the size of the band gap structure may be 4-5 millimeters in width and 13-14 millimeters in length to produce such antenna isolation for collocated antennae operating in the 2.4 GHz frequency band. The band gap structure may provide sufficient antenna isolation for use in transmissions in overlapping frequency bands at the same time (e.g., so that Wi-Fi and Bluetooth transmissions do not need to be time-division duplexed). Transmissions by collocated radios in overlapping frequency bands may have sufficient transmission power to reach their destination, and the reception rates of the collocated radios may be protected from coupling power of transmissions of the other collocated radios of the wireless device.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
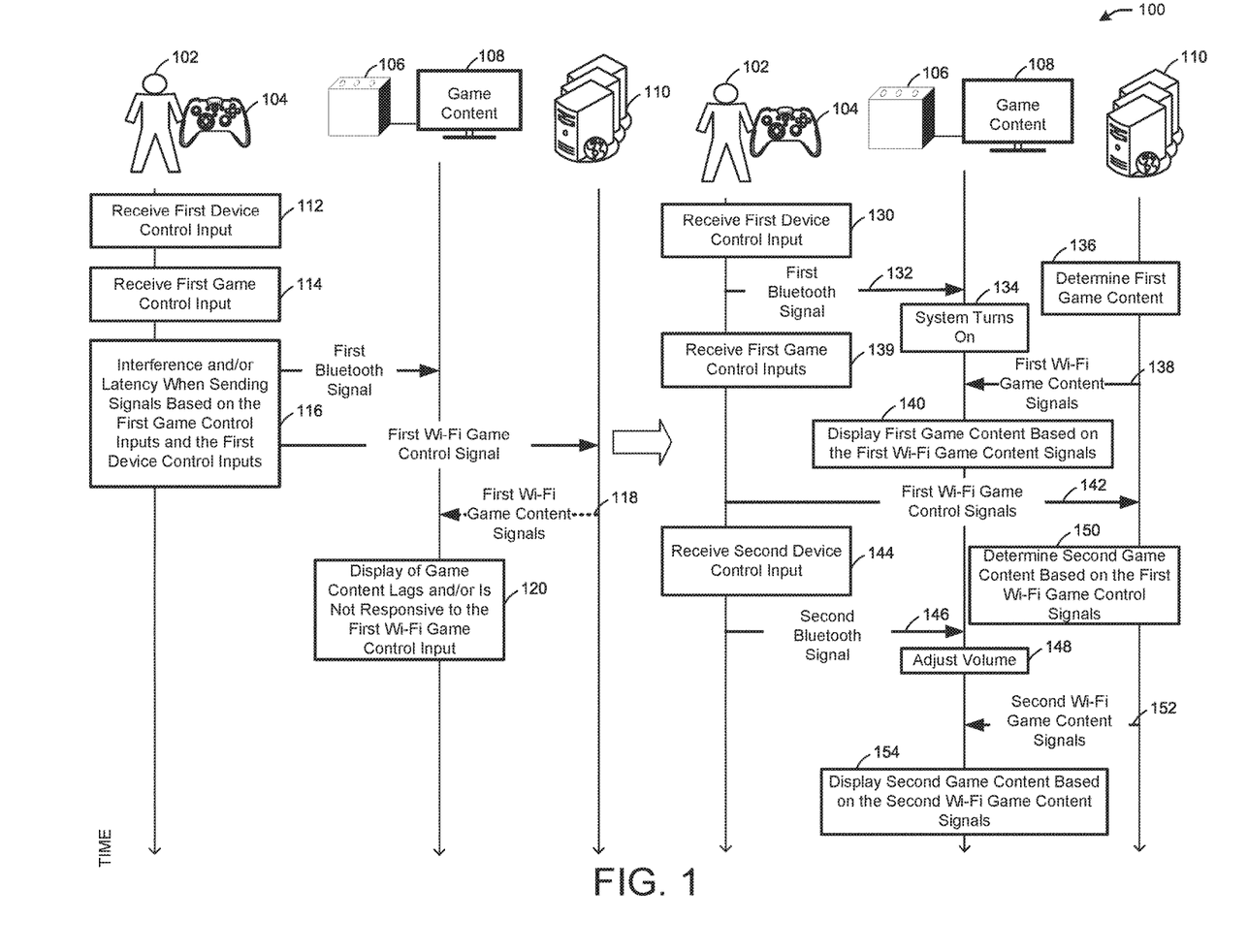
FIG. 1 illustrates a process for using a device with collocated radios, in accordance with one or more example embodiments of the present disclosure.

FIG. 1 illustrates a process 100 for using a device with collocated radios, in accordance with one or more example embodiments of the present disclosure.

Figure 2:
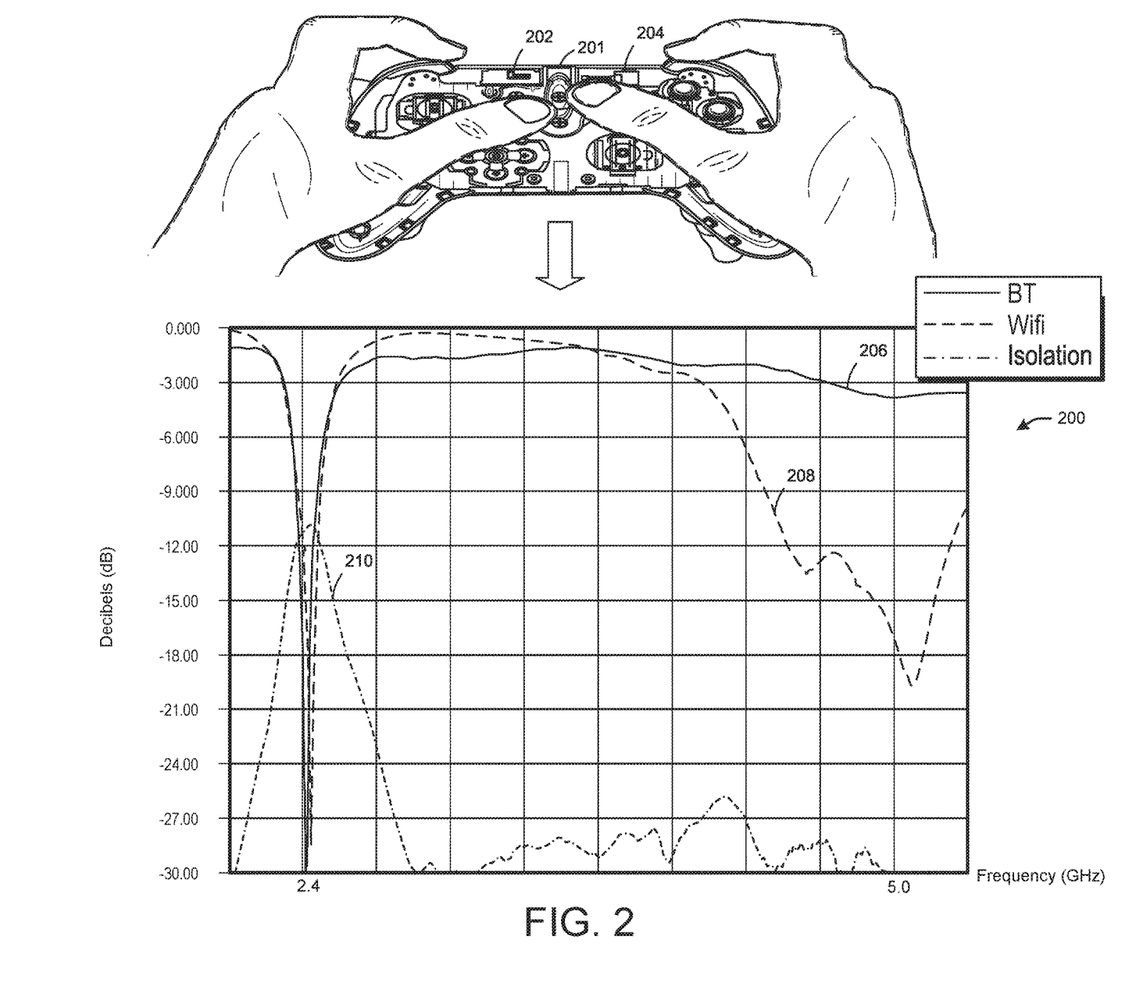
FIG. 2 illustrates a chart showing antenna isolation for a device with collocated radios, in accordance with one or more example embodiments of the present disclosure.

Referring to FIG. 1, the process 100 may include a user 102 with a device 104 (e.g., a game controller, a controller device, a gaming device, a gaming system, etc.) that may control a streaming media device 106 and a display 108. The device 104 may communicate with one or more remote servers 110 (e.g., cloud-based servers) to control a game presented by the display 108. At step 112, the device 104 may receive a first device control input from the user 102, such as a button push, touch, gesture, or voice command. The first device control input may correspond to a command code to control the streaming media device 106 and/or the display 108, such as a command to turn on/activate devices or applications, adjust settings, and the like. At step 114, the device 104 may receive first game control inputs from the user 102, such as button pushes using the device 104, joystick or touch pad movements using the device 104, gestures using the device 104, voice commands received by the device 104 or another device operatively connected to the device 104 (e.g., a headset or other device with a microphone), and the like. At step 116, the device 104 may translate the first device control input and the first game control input into signals to be sent using multiple radios (as shown in FIG. 2) on the device 104, and the device may experience interference and/or latency when sending the corresponding signals. For example, the device 104 may send a first Bluetooth signal corresponding to the first device control signal, and may send a first Wi-Fi game control signal corresponding to the first game control signal, and the concurrent sending of two types of wireless signals may result in interference and/or latency that may prevent or delay the Wi-Fi and Bluetooth signals from being transmitted. The one or more remote servers 110 (e.g., cloud-based servers) may interpret the Wi-Fi game control signals into actions that result in game content controlled by the device 104 being adjusted (e.g., to show movement of a game character corresponding to the first game control input). When latency and/or interference occurs at the device 104, the Wi-Fi game control signals may not be received by the one or more remote servers 110, or the Wi-Fi game control signals may be delayed. When the Wi-Fi game control signals are received by the one or more remote servers 110 on a delay, at step 118, the one or more remote servers 110 may send first Wi-Fi game control signals (e.g., streaming game content to be displayed at the display 108) that show the game content according to the Wi-Fi game control signals received by the device 104, but at step 120, the display may lag (e.g., the corresponding actions of the Wi-Fi game control inputs may occur several seconds after the user 102 provides the first game control inputs). When the Wi-Fi game control signals are not received by the one or more remote servers 110 because of interference at the device 104, the game presentation at step 120 may not reflect the actions intended by the Wi-Fi game control inputs. To reduce the risks of latency and/or interference, the device 104 may use a multi-antenna isolation structure (e.g., a band gap structure) as described further herein.

Still referring to FIG. 1, at step 130, the device 104 (e.g., with a multi-antenna isolation structure—not shown in FIG. 1) may receive a first device control input from the user 102, such as a button push, touch, gesture, or voice command. The first device control input may correspond to a command code to control the streaming media device 106 and/or the display 108, such as a command to turn on/activate devices or applications, adjust settings, and the like. At step 132, the device 104 may send a first Bluetooth signal corresponding to the first device control input to the streaming media device 106 and/or to the display 108. At step 134, the system (e.g., the streaming media device 106 and/or the display 108) may turn on and activate a gaming application. For example, the first Bluetooth signal (or multiple Bluetooth signals at step 112) may include commands to control the streaming media device 106 and/or to the display 108, such as power on/off commands, input port (e.g., HDMI 1, HDMI 2, RCA, VGA, etc.) commands, volume adjustment commands, selections of applications and content, and the like. In this manner, the device 104 may function as a remote control device for the streaming media device 106 and/or the display 108. At step 136, the one or more remote servers 110 may determine first game content to facilitating playing of a game presented by the streaming media device 106 and/or the display 108. The one or more remote servers 110 may store game content and may stream the game content as streaming video and audio to the streaming media device 106, which may be an application executing on the display 108 or may be a separate physical device operatively connected to the display 108 (e.g., using an input port of the display 108). The streaming media device 106 may receive streaming content from the one or more remote servers 110, and may cause the display 108 to present the streaming content.

Still referring to FIG. 1, at step 138, the one or more remote servers 110 may send first Wi-Fi game content signals to the streaming media device 106 and/or to the display 108. The Wi-Fi game content signals may include the game content streamed using Wi-Fi signals for presentation at the display 108. At step 140, the display 108 may display the first game content based on the first Wi-Fi game content signals. At step 139, the device 104 may receive first game control inputs from the user 102, such as button pushes using the device 104, joystick or touch pad movements using the device 104, gestures using the device 104, voice commands received by the device 104 or another device operatively connected to the device 104 (e.g., a headset or other device with a microphone), and the like. The device 104 may, at step 142, send first Wi-Fi game control signals to the one or more remote servers 110. For example, inputs and gestures detected by the device 104 may be translated into Wi-Fi signals sent by the device 104 to the one or more remote servers 110 to control the game content.

Still referring to FIG. 1, at step 144, the device 104 may receive additional inputs from the user 102, such as a second device control input (e.g., a control signal to adjust the volume of the display 108). At step 146, the device 104 may translate the second device control input into a second Bluetooth signal, and may send the second Bluetooth signal to the display 108. At step 148, the display 108 may respond to the second Bluetooth signal, such as by adjusting a volume of the display 108. At step 150 (which may occur before, during, or after step 144), the one or more remote servers may determine second game content based on the first Wi-Fi game control signals received at step 142. For example, the first Wi-Fi game control signals may include game controls, such as movements, actions, selections, and the like for controlling a game (e.g., a video game control to move a character, cause the character to act, to select items or menus, etc.). The one or more remote servers 110 may translate the first Wi-Fi game control signals into actions and the corresponding content to display (e.g., when the first Wi-Fi game control signals include moving a game character to the right on the display 108, the one or more remote servers 110 may determine the resulting video frames to display at the display 108 to represent the character moving directionally to the right). At step 152, the one or more remote servers 110 may send second Wi-Fi game content signals to the streaming media device 106 and/or to the display 108. For example, the second Wi-Fi game content signals may include streaming game content the corresponds to the first Wi-Fi game control signals of step 142. At step 154, the display 108 may display the second game content based on the second Wi-Fi game content signals. When the second Wi-Fi game content signals correspond to a movement of a game character, the second game content may include video frames representing the game character moving according to the second Wi-Fi game content signals. In this manner, for the displayed game content to be in real-time with respect to game control inputs received by the device 104 from the user 102, latency for the wireless signals sent and receive by the device 104 may need to be minimal, and interference may need to be small to avoid signals not being sent and received.

In one or more embodiments, the device 104 may include a game controller, a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

FIG. 2 illustrates a chart 200 showing antenna isolation for a device with collocated radios, in accordance with one or more example embodiments of the present disclosure.

Figure 3:
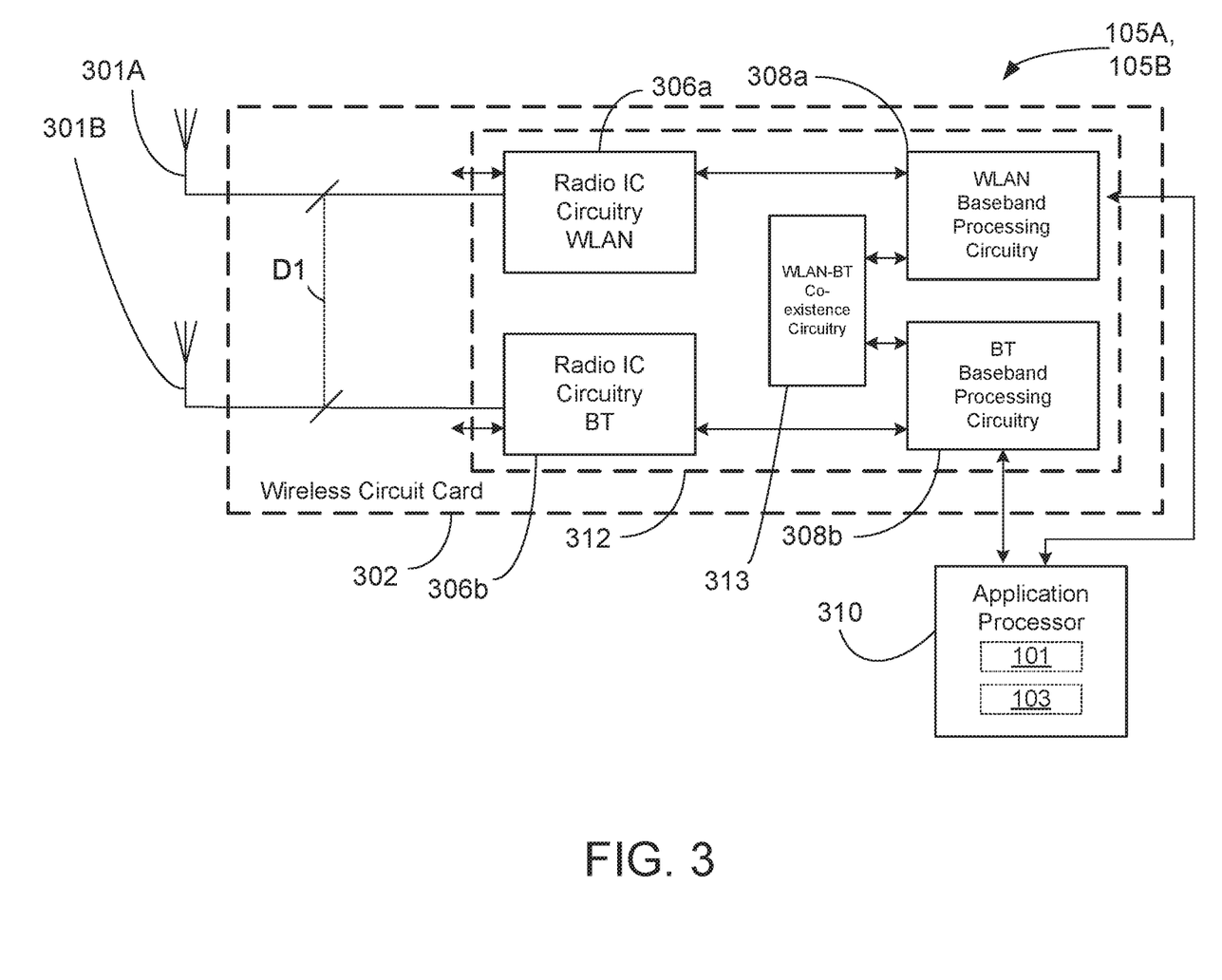
FIG. 3 is a block diagram of a radio architecture, in accordance with one or more example embodiments of the present disclosure.

Referring to FIG. 2, a device 201 may correspond to the device 104 of FIG. 1 and may be used to control devices and to receive game inputs. The device 201 may have collocated radios, such as a first radio 202 and a second radio 204. The first radio 202 and the second radio 204 may include a Wi-Fi radio, a Bluetooth radio, a Zigbee radio, or other types of radios. The first radio 202 and the second radio 204 may use different respective wireless communication techniques (e.g., IEEE 802.11 Wi-Fi, IEEE 802.15.1 Bluetooth, Zigbee, and the like). The first radio 202 may send and receive signals with dedicated antennae, and the second radio 204 may send and receive signals with dedicated antennae (e.g., as shown in FIG. 3). Because the antennae of the first radio 202 and the antennae of the second radio 204 may be located in close proximity to one another (e.g., within 15 millimeters of one another), and because the first radio 202 and the second radio 204 may send and receive wireless signals at overlapping times and/or frequencies, the first radio 202 and the second radio 204 may experience interference and may lack significant antenna isolation. For example, antenna isolation for the first radio 202 and the second radio 204 may be 10 dBs or less, which may result in some wireless signals of one radio interfering with the other radio, causing inputs to be delayed or missed, and undermining user experience.

The chart 200 of FIG. 2 shows an example of antenna isolation for the first radio 202 and the second radio 204 without a band gap structure to improve antenna isolation for collocated radios in close proximity to one another. As shown in the chart 200, when operating in a 2.4 GHz frequency band, Bluetooth antenna return-loss 206 and Wi-Fi antenna return-loss 208 of the device 201 may be 10-12 dBs( ). As shown in FIG. 2, the antenna isolation 210 for the first radio 202 and the second radio 204 may be less than 10 dBs at 2.4 GHz. For some operations, such as gameplay requiring low interference and low latency (e.g., as shown in the process 100 of FIG. 1), antenna isolation may need to be increased, such as to 15 dBs or more (e.g., 18 dBs). However, when the first radio 202 and the second radio 204 operate in overlapping lower frequencies, such as in the 2.4 GHz band, the antenna isolation 210 may need to be increased for gaming applications using the device 201.

FIG. 3 is a block diagram of a radio architecture 105A, 105B in accordance with some embodiments that may be implemented in any one of the example device 104 of FIG. 1. Radio architecture 105A, 105B may include radio integrated circuit (IC) circuitry 306a-b and baseband processing circuitry 308a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably. Radio architecture 105A, 105B may refer to radios, transceivers, and the like.

Radio IC circuitry 306a-b as shown may include WLAN radio IC circuitry 306a and Bluetooth (BT) radio IC circuitry 306b. The WLAN radio IC circuitry 306a may include a receive signal path which may include circuitry to down-convert WLAN radiofrequency (RF) signals and provide baseband signals to WLAN baseband processing circuitry 308a. BT radio IC circuitry 306b may in turn include a receive signal path which may include circuitry to down-convert BT RF signals and provide baseband signals to BT baseband processing circuitry 308b. WLAN radio IC circuitry 306a may also include a transmit signal path which may include circuitry to up-convert WLAN baseband signals provided by the WLAN baseband processing circuitry 308a and provide WLAN RF output signals for subsequent wireless transmission by the one or more Wi-Fi antennas 301A. BT radio IC circuitry 306b may also include a transmit signal path which may include circuitry to up-convert BT baseband signals provided by the BT baseband processing circuitry 308b and provide BT RF output signals for subsequent wireless transmission by one or more BT antennas 301B. In the embodiment of FIG. 3, although radio IC circuitries 306a and 306b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals. The one or more Wi-Fi antennas 301A and the one or more BT antennas 301B may be separated by a distance D1, which may be less than 15 millimeters (e.g., 10 millimeters or less).

Baseband processing circuitry 308a-b may include a WLAN baseband processing circuitry 308a and a BT baseband processing circuitry 308b. The WLAN baseband processing circuitry 308a may include a memory, such as, for example, a set of RAM arrays in a Fast Fourier Transform or Inverse Fast Fourier Transform block (not shown) of the WLAN baseband processing circuitry 308a. Each of the WLAN baseband circuitry 308a and the BT baseband circuitry 308b may further include one or more processors and control logic to process the signals received from the corresponding WLAN or BT receive signal path of the radio IC circuitry 306a-b, and to also generate corresponding WLAN or BT baseband signals for the transmit signal path of the radio IC circuitry 306a-b. Each of the baseband processing circuitries 308a and 308b may further include physical layer (PHY) and medium access control layer (MAC) circuitry, and may further interface with a device for generation and processing of the baseband signals and for controlling operations of the radio IC circuitry 306a-b.

Referring still to FIG. 3, according to the shown embodiment, WLAN-BT coexistence circuitry 313 may include logic providing an interface between the WLAN baseband circuitry 308a and the BT baseband circuitry 308b to enable use cases requiring WLAN and BT coexistence.

In some embodiments, the radio IC circuitry 306a-b, and baseband processing circuitry 308a-b may be provided on a single radio card, such as wireless radio card 302. In some other embodiments, the one or more antennas 301A-B and the radio IC circuitry 306a-b may be provided on a single radio card or on multiple radio cards. In some other embodiments, the radio IC circuitry 306a-b and the baseband processing circuitry 308a-b may be provided on a single chip or integrated circuit (IC), such as IC 312.

In some embodiments, the wireless radio card 302 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 3, the BT baseband circuitry 308b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., SGPP such as LTE, LTE-Advanced or 7G communications).

In some embodiments, the radio architecture 105A, 105B may be configured for communication over various channel bandwidths including bandwidths having center frequencies of about 900 MHz, 1.8 GHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies, however.

Figure 4A:
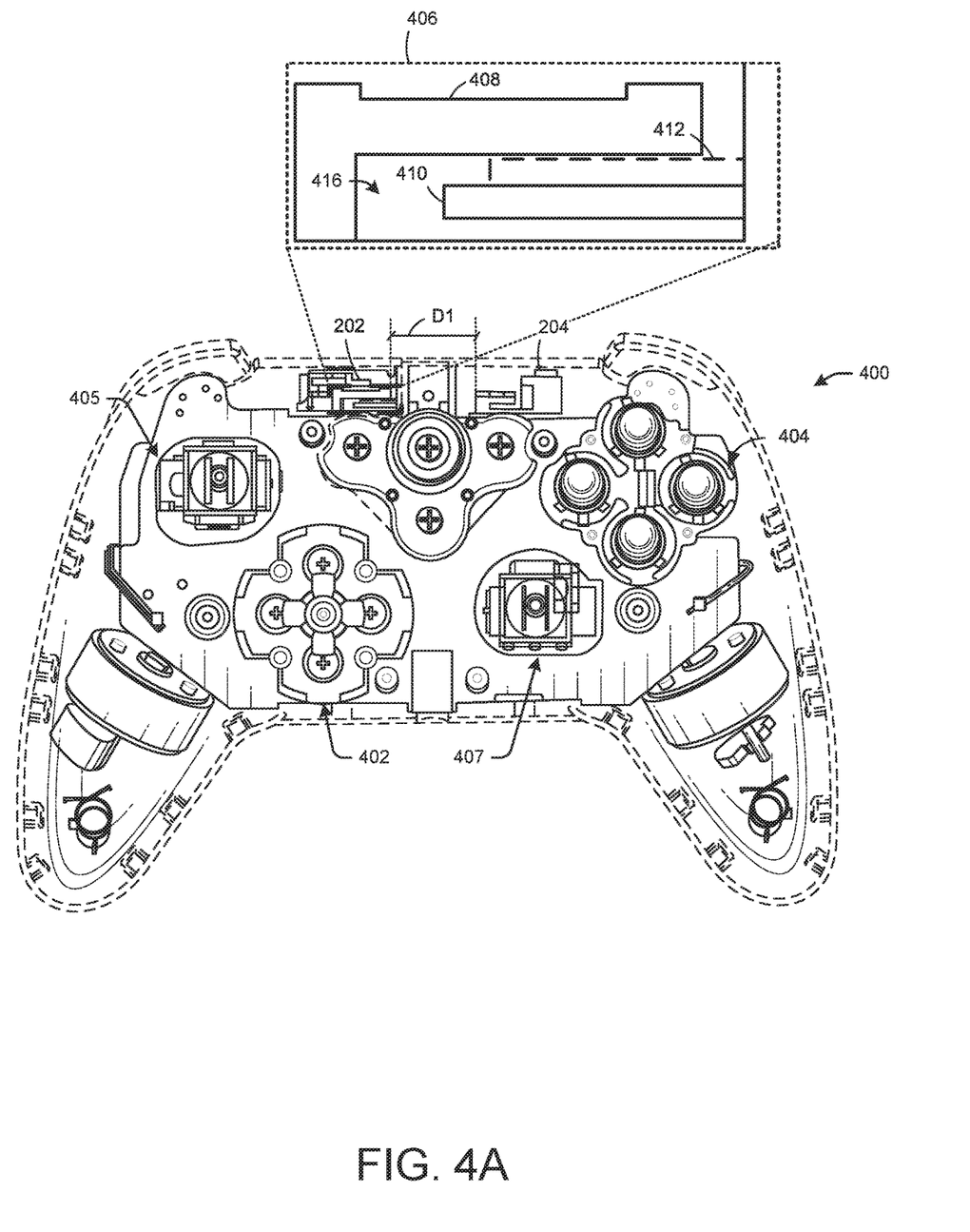
FIG. 4A illustrates a device with collocated radios and a band gap structure, in accordance with one or more example embodiments of the present disclosure.

FIG. 4A illustrates a device 400 with collocated radios and a band gap structure, in accordance with one or more example embodiments of the present disclosure.

Referring to FIG. 4A, the device 400 may be function as a game and device controller (e.g., similar to the device 104 of FIG. 1), and may include a variety of input devices, such as a directional pad 402 (e.g., for controlling directional movements, up, down, left, and right in a game controlled by the device 400), buttons 404 (e.g., the buttons 404 may cause game actions such as running, jumping, throwing, selecting, picking up, dropping, and the like), joystick 405, and joystick 407. The device 400 may include the first radio 202 (e.g., which may correspond to the BT radio IC circuitry 306b and may include the one or more BT antennas 301B of FIG. 3) and the second radio 204 (e.g., which may correspond to the WLAN radio IC circuitry 306a and may include the one or more Wi-Fi antennas 301A of FIG. 3), and whose respective antennae may be separated from one another by the distance D1 (e.g., as shown in FIG. 3), which may be less than 15 millimeters (e.g., 10 millimeters or less).

Still referring to FIG. 4A, to improve the antenna isolation shown in the chart 200 of FIG. 2, the device 400 may include a band gap structure 406 (e.g., a multi-antenna isolation structure or multi-antenna isolation device) positioned at least partially between the first radio 202 (e.g., and associated antennae) and the second radio 204 (e.g., and associated antennae). As shown in FIG. 4A, the band gap structure 406 may be positioned proximate to antennae of the first radio 202 (antennae as shown in FIG. 3), and may include multiple conductive portions or elements (e.g., conductive portion 408, conductive portion 410, conductive portion 412) positioned on a circuit board 414, such as a printed circuit board. Antennae of the first radio 202 and the second radio 204 may be positioned on the printed circuit board on a same side (e.g., the front side) or on opposite sides (e.g., one radio one the front side, one radio on the back side). The front side of the device 400 and the circuit board 414 are shown in FIG. 4A. The conductive portions/elements of the band gap structure 406 may include conductive material such as copper, silver, gold, stainless steel, etc. The conductive portion 408 and the conductive portion 410 may be positioned on one side of the circuit board 414 (e.g., the front side as shown), and the conductive portion 412 may be positioned on the opposite side of the circuit board 414 (e.g., as shown in more detail in FIG. 5B). The conductive portion 408 and the conductive portion 410 may be separated by a small gap (e.g., as described further with regard to FIG. 5A and FIG. 5B) that may trap or choke current associated with wireless signals sent and received by the first radio 202 and the second radio 204. For example, the BT signals sent and received by the first radio 202 may be choked by the band gap structure 406 so that the BT signals do not interfere with the second radio 204, and the Wi-Fi signals sent and received by the second radio 204 may be choked by the band gap structure 406 so that the Wi-Fi signals do not interfere with the first radio 202, thereby increasing throughput and reducing power coupling between the radios.

As the band gap structure 406 is formed by the separation and conduction of the conductive portion 408 and the conductive portion 410, current may travel to the conductive portion 408 and the conductive portion 412, and eventually through the band gap structure 406 so that the current may be effectively trapped by the gap 416 defined by the separation of the conductive portion 408 and the conductive portion 412. Because current is trapped by the band gap structure 406, the trapped current may not reach the first radio 202 from the second radio 204, and may not reach the second radio 204 from the first radio 202. The reduction in current from the first radio 202 seen by the second radio 204 and in current from the second radio 204 seen by the first radio 202 may provide increased antenna isolation (e.g., over 18 dBs) without requiring increased physical separation or adjustment to the frequency bands in which the radios operate. The improved isolation is discussed further below with respect to FIG. 4C.

Figure 4B:
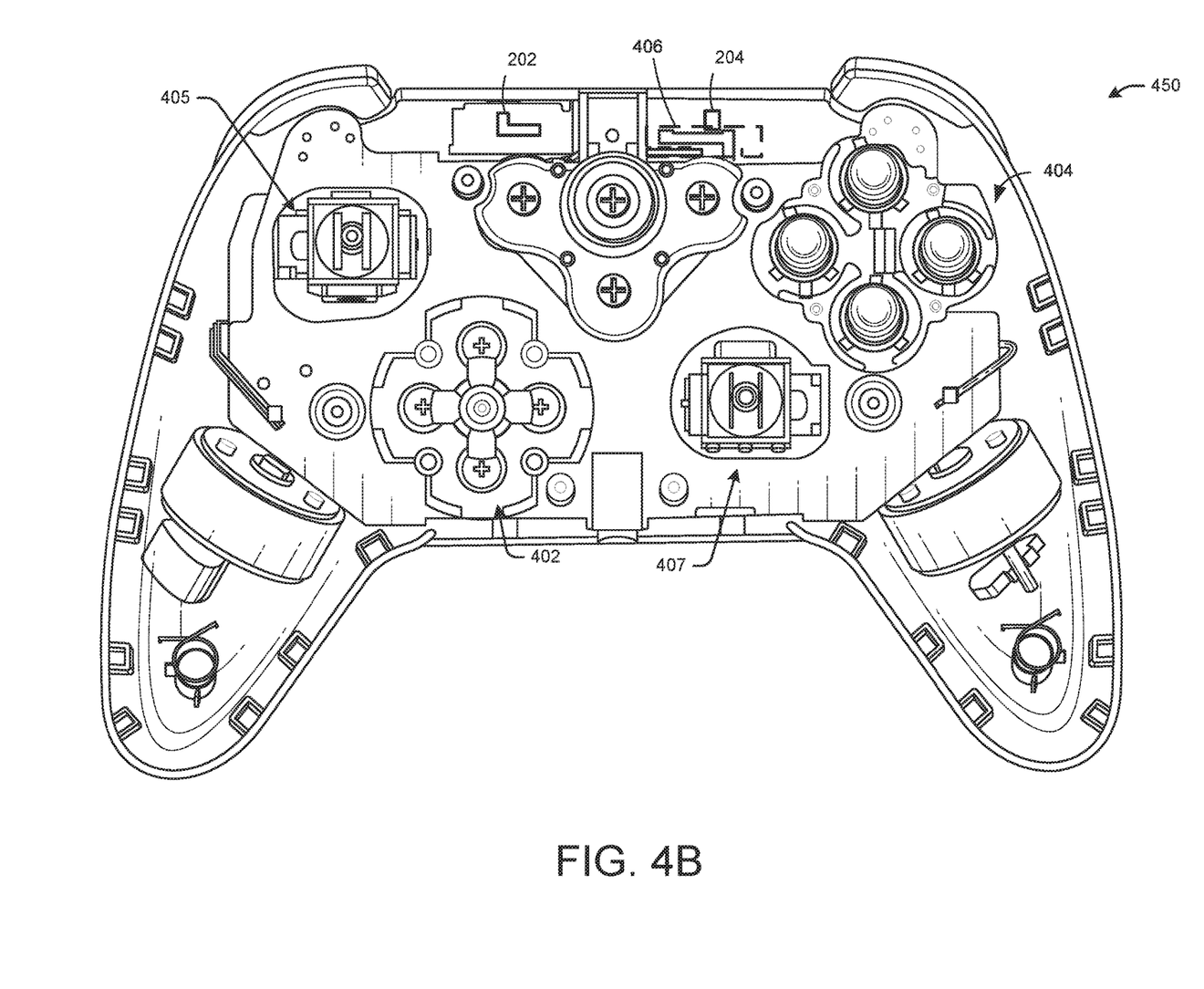
FIG. 4B illustrates a device with collocated radios and a band gap structure, in accordance with one or more example embodiments of the present disclosure.

FIG. 4B illustrates a device 450 with collocated antennae and a band gap structure, in accordance with one or more example embodiments of the present disclosure.

Referring to FIG. 4B, the device 450 may include the first radio 202, the second radio 204, and the band gap structure 406 as the device 400 of FIG. 4A does, but the band gap structure 406 in FIG. 4B may be more proximate to the second radio 204 (e.g., specifically more proximate to the antennae used by the second radio 204). The structure of the band gap structure 406 may be the same as shown in FIG. 4A, but the position of the band gap structure 406 may be different than in FIG. 4A, and may be in a mirrored orientation (e.g., rotated 180 degrees) from the orientation shown in FIG. 4A. Because current is trapped by the band gap structure 406, the trapped current may not reach the first radio 202 from the second radio 204, and may not reach the second radio 204 from the first radio 202. The reduction in current from the first radio 202 seen by the second radio 204 and in current from the second radio 204 seen by the first radio 202 may provide increased antenna isolation (e.g., over 18 dBs) without requiring increased physical separation or adjustment to the frequency bands in which the radios operate.

Figure 4C:
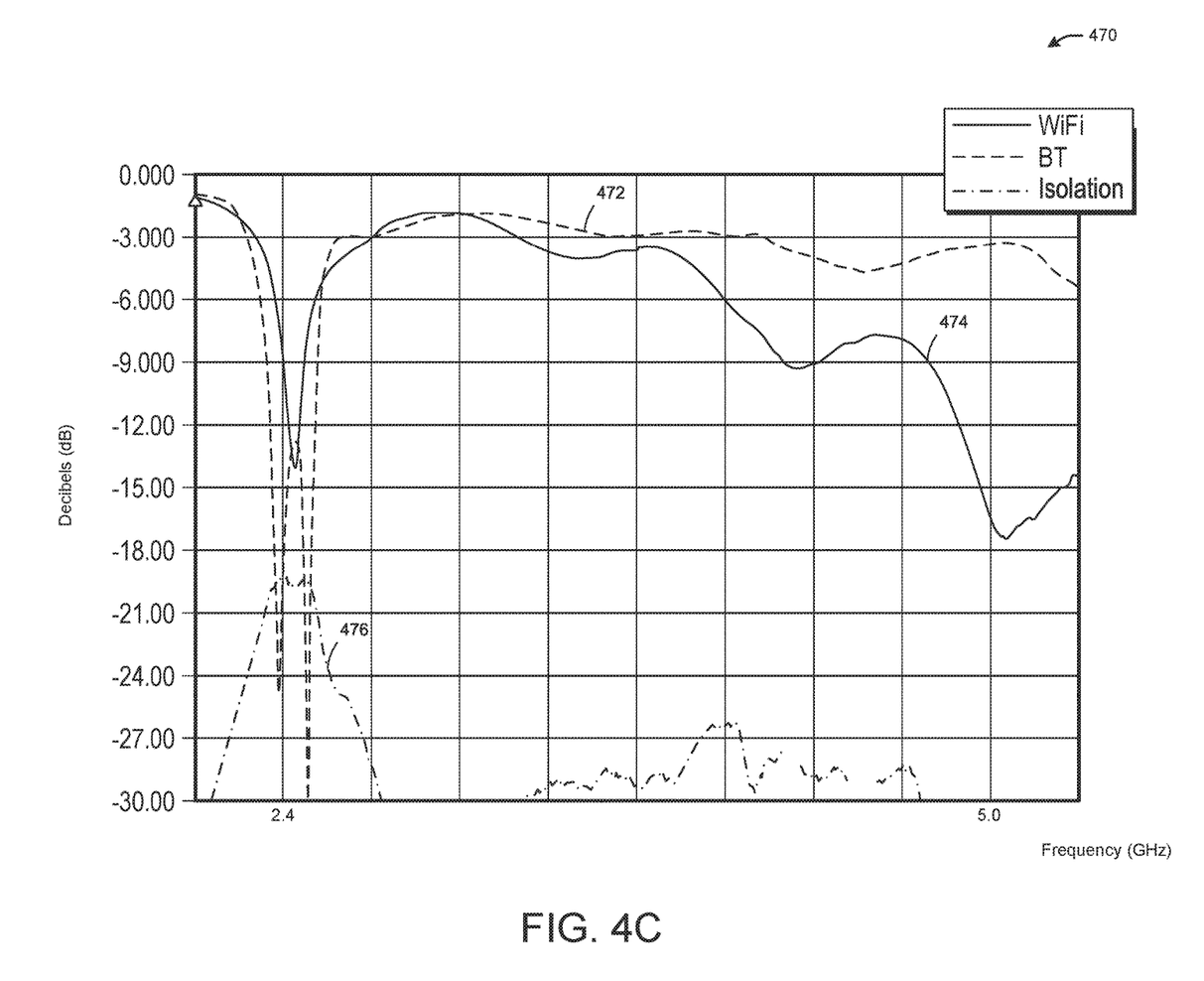
FIG. 4C illustrates a chart showing improved antenna isolation for a device with collocated radios, in accordance with one or more example embodiments of the present disclosure.

FIG. 4C illustrates a chart 470 showing antenna isolation for a device with collocated antennae, in accordance with one or more example embodiments of the present disclosure.

Referring to FIG. 4C, the chart 470 shows the BT antenna return-loss 472, Wi-Fi antenna return-loss 474, and improved antenna isolation 476 for the BT and Wi-Fi antenna of the device 400 of FIG. 4A (and the device 450 of FIG. 4B may see similar isolation improvement) when including the band gap structure 406 in comparison to the device 201 of FIG. 2 without the band gap structure 406. As shown in the chart 470, at a frequency band of 2.4 GHz, the BT and Wi-Fi antenna isolation 476 may increase from around 10 dBs in FIG. 2 to 18 dBs or higher in FIG. 4C in part because of the band gap structure 406.

In one or more embodiments, the band gap structure 406 may improve antenna isolation by eight or more dBs when the distance D1 of FIG. 4A is ten millimeters or less (e.g., when antennae of the first radio 202 and antennae of the second radio 204 are in close proximity to one another) and when the one or more Wi-Fi antennas 301A and the one or more BT antennas 301B are operating in the same frequency bands. The sizes of the conductive portions may be the same as or different than any other conductive portion, and the shapes of the conductive portions may be the same as or different than those of any other conductive portion of the band gap structure 406.

Referring to FIG. 4A and FIG. 4B, the directional pad 402, the buttons 404, the joystick 405, the joystick 407, the first radio 202, the second radio 204, and the band gap structure 406 may be positioned on the circuit board 414. For example, the circuit board 414 may include one or more circuit boards to which components of the device 400 and the device 450 may be operatively connected and on which components of the device 400 and the device 450 may be positioned.

Figure 5A:
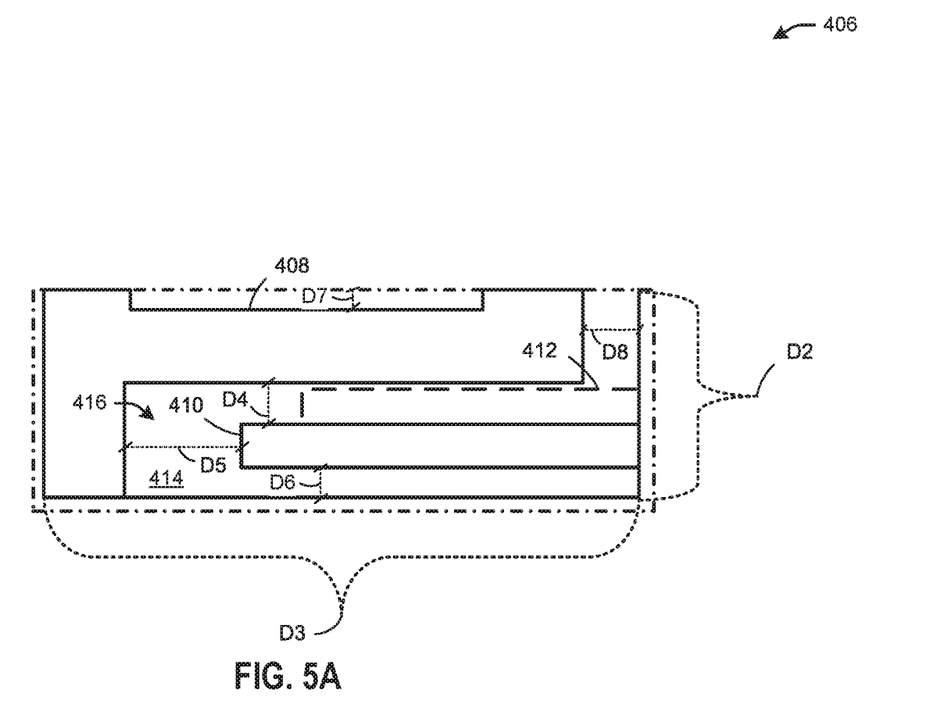
FIG. 5A illustrates a front view of the band gap structure of FIG. 4A and FIG. 4B, in accordance with one or more example embodiments of the present disclosure.

FIG. 5A illustrates a front view of the band gap structure 406 of FIG. 4A and FIG. 4B, in accordance with one or more example embodiments of the present disclosure.

Figure 5B:
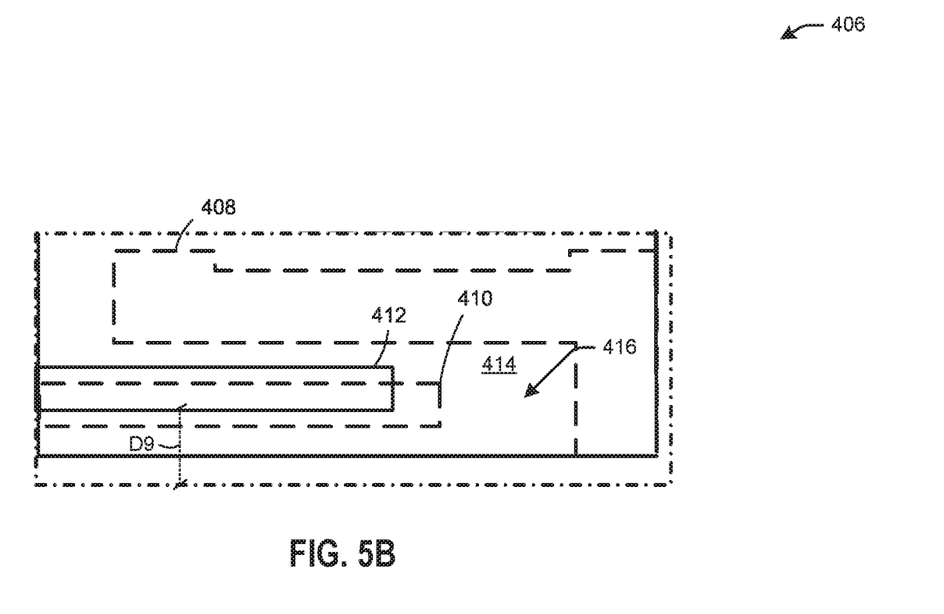
FIG. 5B illustrates a rear view of the band gap structure of FIG. 4A and FIG. 4B, in accordance with one or more example embodiments of the present disclosure.

Referring to FIG. 5A, the band gap structure 406 may include the conductive portion 408 and the conductive portion 410 on the front side of the circuit board 414, and the conductive portion 412 on the back side of the circuit board 414 as shown in FIG. 5B (e.g., when the circuit board 414 is flipped over). The three conductive portions of band gap structure and their gaps may need to be adjusted to tune the band gap to fall in the 2.4 GHz frequency band or another desired band to cover. The band gap structure 406 as shown in FIG. 5A is in the orientation shown in FIG. 4A.

In one or more embodiments, the length of the band gap structure 406 (D2, e.g., from a top end of the band gap structure 406 to a bottom end of the band gap structure 406) may be 5-6 millimeters, and the width of the band gap structure 406 (D3, e.g., from one side of the band gap structure 406 to another of the band gap structure 406) may be 13-14 millimeters. The size (e.g., D2 and D3) may vary based on the frequency band being used, and proper fine tuning. For example, at a 2.4 GHz or similar frequency band operation, the length D2 may be from 4-5 millimeters. At a 2.4 GHz or similar frequency band operation, the width D3 may be from 13-14 millimeters. A distance D4 between the conductive portion 408 and the conductive portion 410 may be between 0.8-1.2 millimeters (e.g., 1.0 millimeters). A distance D5 between the conductive portion 408 and the conductive portion 410 may be between 1.8-2.2 millimeters (e.g., 2.0 millimeters). A distance D6 between the conductive portion 410 and a next component of the device 400 may be 0.6-0.7 millimeters (e.g., 0.65 millimeters). A distance D8 between the conductive portion 408 and a next component of the device 400 may be 1.2-1.6 millimeters (e.g., 1.4 millimeters).

FIG. 5B illustrates a rear view of the band gap structure 406 of FIG. 4A and FIG. 4B, in accordance with one or more example embodiments of the present disclosure.

Referring to FIG. 5B, the conductive portion 412 is shown on the rear side of the circuit board 414, with the conductive portion 408 and the conductive portion 410 on the opposite (e.g., front) side. The positioning of the conductive portion 412 may allow for current to be trapped between the conductive portion 408 and the conductive portion 410 so that the band gap structure 406 chokes current between the first radio 202 and the second radio 202 of FIG. 4A and FIG. 4B. A distance D9 between the conductive portion 412 and a next component of the device 400 may be 1.0-1.4 millimeters (e.g., 1.25 millimeters).

Figure 6:
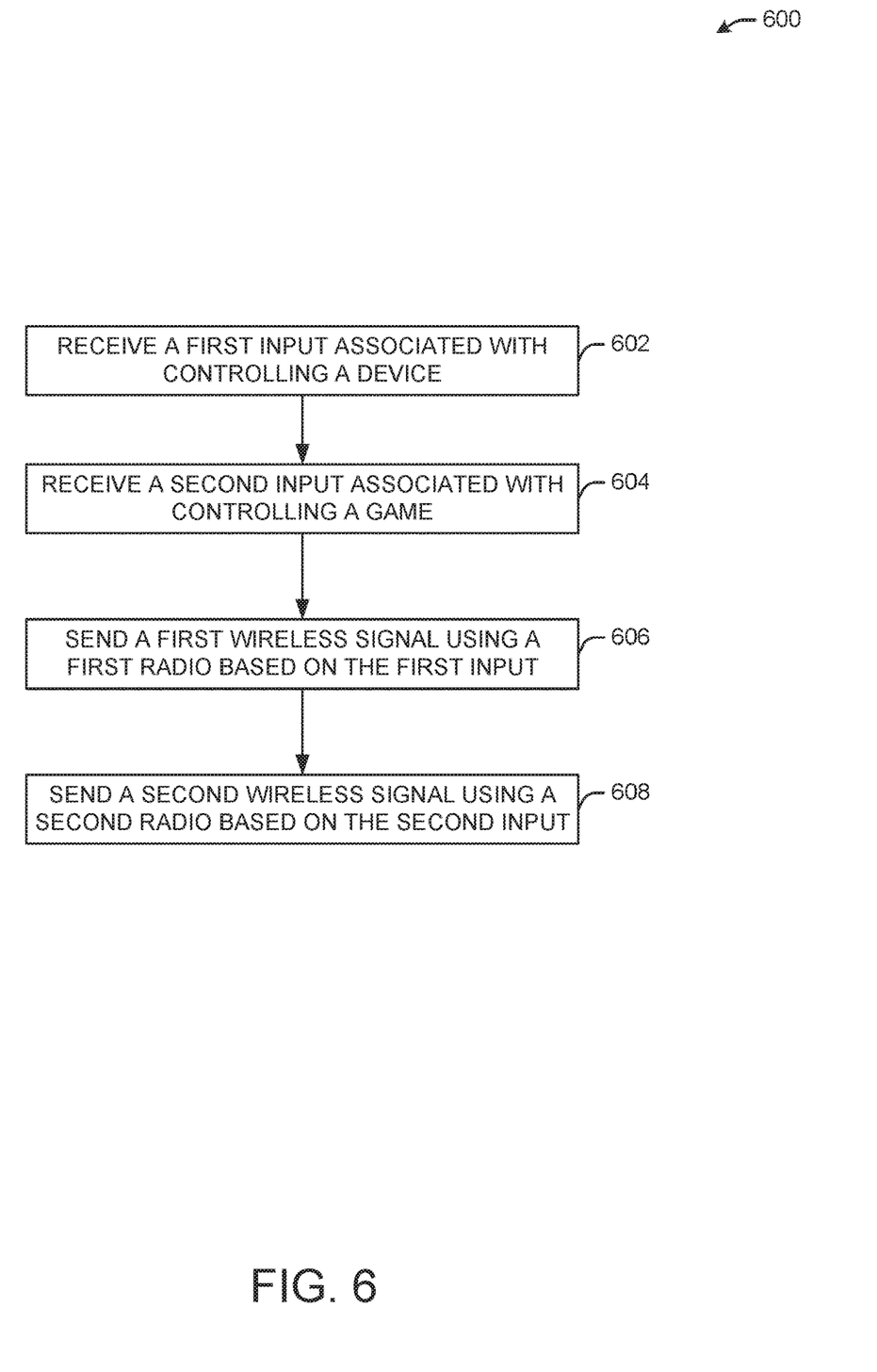
FIG. 6 illustrates a flow diagram for a process for using a device with collocated radios and a band gap structure, in accordance with one or more example embodiments of the present disclosure.

FIG. 6 illustrates a flow diagram for a process 600 for using a device with collocated radios and a band gap structure, in accordance with one or more example embodiments of the present disclosure.

At block 602, a device (e.g., the device 104 of FIG. 1, the device 400 of FIG. 4A, the device 450 of FIG. 4B) may receive a first input associated with controlling another device. The first input may include a button push (e.g., a push of the buttons 404 of FIG. 4A and FIG. 4B), a touch (e.g., a touch of the directional pad 402 of FIG. 4A and FIG. 4B), gesture, or voice command. The first device control input may correspond to a command code to control another device (e.g., the streaming media device 106 and/or the display 108 of FIG. 1), such as a command to turn on/activate devices or applications, adjust settings, and the like.

At block 604, the device may receive a second input associated with controlling a game. The second input may include button pushes using the buttons 404 of FIG. 4A and FIG. 4B, joystick or touch pad movements using the device 104 (e.g., movements with the directional pad 402 of FIG. 4A and FIG. 4B), gestures using the device 104, voice commands received by the device 104 or another device operatively connected to the device 104 (e.g., a headset or other device with a microphone), and the like. The second input may correspond to controlling a game (e.g., a video game control to move a character, cause the character to act, to select items or menus, etc.).

At block 606, the device may send a first wireless signal (e.g., a BT signal) using a first radio (e.g., the first radio 202 of FIG. 2, FIG. 4A, and FIG. 4B) based on the first input. At block 608 the device may send a second wireless signal (e.g., a Wi-Fi signal) using a second radio (e.g., the second radio 204 of FIG. 2, FIG. 4A, and FIG. 4B) based on the second input. The device may translate the first and second inputs into the respective signals sent using separate collocated radios. For example, BT circuitry (e.g., the BT radio IC circuitry 306b and the BT baseband processing circuitry 308b of FIG. 3) may facilitate the sending of the first wireless signal using the first radio, and Wi-Fi circuitry (e.g., the WLAN radio IC circuitry 306a and the WLAN baseband processing circuitry 308a of FIG. 3) may facilitate the sending of the second wireless signal using the second radio. A remote device (e.g., the one or more remote servers 110 of FIG. 1) may determine second game content based on the second wireless signal. For example, the second wireless signal may include game controls, such as movements, actions, selections, and the like for controlling a game (e.g., a video game control to move a character, cause the character to act, to select items or menus, etc.). The remote device may translate the second wireless signal into actions and the corresponding content to display (e.g., when the second wireless signal includes moving a game character to the right on the display 108, the one or more remote servers 110 may determine the resulting video frames to display at the display 108 to represent the character moving directionally to the right). The remote device may send Wi-Fi game content signals to another device (e.g., the streaming media device 106 and/or to the display 108 of FIG. 1). For example, the Wi-Fi game content signals may include streaming game content the corresponds to the second wireless signal. The display 108 may display the second game content based on the second Wi-Fi game content signals.

In one or more embodiments, the device may block or choke current (e.g., by receiving current and preventing the current from reaching another antenna or radio of the device) generated based on the sending of the first or second wireless signals. The device may include the band gap structure 406 of FIG. 4A, FIG. 4B, FIG. 5A, and FIG. 5B, which may be positioned at least partially between the first radio and the second radio, proximate to the first radio or to the second radio, or equidistant from of the first radio and the second radio. The band gap structure may receive current from one or both of the radios as they send or receive wireless signals, and the current may be blocked by conductive portions forming the band gap structure (e.g., the band gap structure 416 of FIG. 4A, FIG. 4B, FIG. 5A, and FIG. 5B).

The processes described and shown above may be carried out or performed in any suitable order as desired in various implementations. Additionally, in certain implementations, at least a portion of the processes may be carried out in parallel, creating a co-existence use case. Furthermore, in certain implementations, less than or more than the processes described may be performed.

Certain aspects of the disclosure are described above with reference to flow diagrams of methods, apparatuses, or computer program products according to various implementations. It will be understood that one or more blocks of the flow diagrams, and combinations of blocks in the flow diagrams, can be implemented by computer-executable program instructions. Likewise, some blocks of the flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the flow diagrams support combinations of means for performing the specified functions, combinations of elements or steps for performing the specified functions and program instruction means for performing the specified functions. It will also be understood that each block of the flow diagrams, and combinations of blocks in the flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

What is claimed is:

1. A gaming device comprising:
a printed circuit board;
a first control button and a second control button, the first control button and the second control button operatively connected to the printed circuit board;
a first radio operatively connected to the printed circuit board, the first radio associated with a Wi-Fi antenna configured to transmit and receive Wi-Fi signals associated with the first control button;
a second radio operatively connected to the printed circuit board, the second radio associated with a Bluetooth antenna configured to transmit and receive Bluetooth signals associated with the second control button, wherein the Wi-Fi antenna and the Bluetooth antenna are separated on the printed circuit board by a distance of less than fifteen millimeters; and
an isolation structure operatively connected to the printed circuit board and physically disconnected from the Wi-Fi antenna and the Bluetooth antenna, the isolation structure comprising:
a first conductive portion positioned on a front surface of the printed circuit board;
a second conductive portion positioned on the front surface of the printed circuit board; and
a third conductive portion positioned on a rear surface of the printed circuit board, wherein the first conductive portion is separated from the second conductive portion on the front surface of the printed circuit board, and wherein the isolation structure is configured to restrict current associated with the transmission or the reception of the Wi-Fi signals and the Bluetooth signals.

2. The gaming device of claim 1, wherein the first radio and the second radio are configured to operate in a 2.4 GHz frequency band, wherein a length of the isolation structure is between 13-14 millimeters, and wherein a width of the isolation structure is between 4-5 millimeters.

3. The gaming device of claim 1, wherein a first distance between the first conductive portion and the second conductive portion is approximately one millimeter, and wherein a second distance between the first conductive portion and the second conductive portion is approximately two millimeters.

4. A device comprising:
a first radio associated with a first antenna configured to transmit and receive first wireless signals using a first wireless communication technique;
a second radio associated with a second antenna configured to transmit and receive second wireless signals using a second wireless communication technique, the first radio and the second radio positioned on a front surface of a printed circuit board; and
an isolation structure physically disconnected from the first antenna and the second antenna, and configured to restrict a portion of current associated with the transmission or the reception of at least one of the first wireless signals or the second wireless signals,
the isolation structure comprising:
a first portion positioned on the front surface of the printed circuit board;
a second portion positioned on the front surface of the printed circuit board; and
a third portion positioned on a rear surface of the printed circuit board, wherein the first portion is separated from the second portion on the front surface of the printed circuit board, and wherein the isolation structure is configured to restrict current associated with the transmission or the reception of the first wireless signals and the second wireless signals.

5. The device of claim 4, wherein the first wireless communication technique is Bluetooth, wherein the second wireless communication technique is Wi-Fi, and wherein the isolation structure is located proximate to the first radio.

6. The device of claim 4, wherein the first wireless communication technique is Bluetooth, wherein the second wireless communication technique is Wi-Fi, and wherein the isolation structure is located proximate to the second radio.

7. The device of claim 4, wherein the first portion, the second portion, and the third portion comprise a conductive material.

8. The device of claim 4, wherein the first portion is a different shape than the second portion.

9. The device of claim 4, wherein the first antenna is positioned at a first position, wherein the second antenna is positioned at a second position that is less than fifteen millimeters from the first position.

10. The device of claim 4, wherein the isolation structure is configured to generate an antenna isolation of at least 18 decibels when the first antenna and the second antenna operate in a 2.4 GHz frequency band.

11. The device of claim 4, wherein the first radio and the second radio are configured to operate in a 2.4 GHz frequency band, wherein a length of the isolation structure is between 13-14 millimeters, and wherein a width of the isolation structure is between 4-5 millimeters.

12. The device of claim 4, wherein a first distance between a first conductive portion of the isolation structure and a second conductive portion of the isolation structure is approximately one millimeter, and wherein a second distance between the first conductive portion and the second conductive portion is approximately two millimeters.

13. A gaming controller, comprising:
a first control button and a second control button;
a first radio associated with a first antenna configured to transmit and receive first wireless signals using a first wireless communication technique, the first wireless signals associated with the first control button;
a second radio associated with a second antenna configured to transmit and receive second wireless signals using a second wireless communication technique, the second wireless signals associated with the second control button, the first radio and the second radio positioned on a front surface of a printed circuit board; and
an isolation structure configured to restrict a portion of current associated with the transmission or the reception of at least one of the first wireless signals or the second wireless signals,
the isolation structure comprising:
a first portion positioned on the front surface of the printed circuit board;
a second portion positioned on the front surface of the printed circuit board; and
a third portion positioned on a rear surface of the printed circuit board, wherein the first portion is separated from the second portion on the front surface of the printed circuit board, and wherein the isolation structure is configured to restrict current associated with the transmission or the reception of the first wireless signals and the second wireless signals.

14. The gaming controller of claim 13, wherein the first wireless communication technique is Bluetooth, wherein the second wireless communication technique is Wi-Fi, and wherein the isolation structure is located proximate to the first radio.

15. The gaming controller of claim 13, wherein the first wireless communication technique is Bluetooth, wherein the second wireless communication technique is Wi-Fi, and wherein the isolation structure is located proximate to the second radio.

16. The gaming controller of claim 13, wherein the first portion, the second portion, and the third portion comprise a conductive material.

17. The gaming controller of claim 13, wherein the first antenna is positioned at a first position, wherein the second antenna is positioned at a second position that is less than fifteen millimeters from the first position.

18. The gaming controller of claim 13, wherein the isolation structure is configured to generate an antenna isolation of at least 18 decibels when the first antenna and the second antenna operate in a 2.4 GHz frequency band.

19. The gaming controller of claim 13, wherein the first radio and the second radio are configured to operate in a 2.4 GHz frequency band, wherein a length of the isolation structure is between 13-14 millimeters, and wherein a width of the isolation structure is between 4-5 millimeters.

20. The gaming controller of claim 13, wherein a first distance between the first portion of the isolation structure and the second portion of the isolation structure is approximately one millimeter, and wherein a second distance between the first portion and the second portion is approximately two millimeters.

* * * * *